UNITED STATES PATENT OFFICE.

CARLETON ELLIS, OF MONTCLAIR, NEW JERSEY.

PROCESS OF MAKING AMMONIA.

1,184,839.   Specification of Letters Patent.   Patented May 30, 1916.

No Drawing. Original application filed August 9, 1912, Serial No. 714,155. Divided and this application filed December 15, 1915. Serial No. 66,950.

*To all whom it may concern:*

Be it known that I, CARLETON ELLIS, a citizen of the United States, residing at Montclair, in the county of Essex and State of New Jersey, have invented certain new and useful Improvements in Processes of Making Ammonia, of which the following is a specification.

The present invention relates to the synthesis of ammonia, and has for its object the provision of a process whereby ammonia can be synthetically produced, in an economical manner, and with a large yield per unit of contact mass, and which process shall use a contact material, which is relatively cheap, but which is very highly efficient in the process, and which efficiency is substantially permanent, instead of soon losing its activity as do many of the cataysts heretofore employed.

In my process, I preferably use as the catalyst a material containing a metal of the cerium group, and particularly cerium, as the metallic constituent of the catalyzer. The metal need not be absolutely pure, and in fact it is desirable that small amounts of one or more of such other metals as lanthanum, didymium, yttrium or equivalents thereof be present, as these have a considerable energizing effect upon the cerium, so that cerium containing one or more of such other metals is greatly superior to the pure metal, as a catalyzer in this art for the catalytic production of ammonia.

For the preparation of a suitable catalyst, I preferably proceed in the following manner. Cerium oxid, which is at present a waste product of the gas mantle industry, and which contains usually a sufficiently large amount of the rare metals above referred to, is first washed to remove soluble salts of alkalis, etc., and may be treated in any desired manner to remove impurities which act as contact poisons, or substances which cause a lowering of the catalytic activity, and it is thereafter reduced to metal.

As stated above, cerium oxid often contains small percentages of lanthanum, didymium, yttrium, and certain other substances which greatly enhance the catalytic activity of the cerium, when present in small amounts, but if the amount of these is too small, or if these are absent, further amounts of any or all of these metals, or reducible compounds thereof may be added to the metallic cerium, or to the oxid used. Cerium, containing such small amounts of the other rare metals, is preferably converted into a contact mass in the manner described and claimed in my copending application 714,155, filed August 9, 1912, of which this present application is a division and which application has now matured into Patent No. 1,167,280, January 4, 1916. In said process granular cocoanut charcoal is first washed or extracted with dilute acids, *e. g.*, by boiling with hydrochloric acid of moderate strength, to remove soluble matter, such as alkali and alkaline earth metal salts, and is thereafter washed well with water and dried, and heated in an inert atmosphere to about a red heat, after which hydrogen is passed thereover, at a temperature of from 300° C. up to a red heat, and thereafter molten cerium (prepared in the above manner) is atomized by means of a jet of hydrogen gas under pressure, upon the granular charcoal, which may be contained in a rotating drum, in order to give granular charcoal which is lightly and more or less uniformly coated, and somewhat impregnated, with finely divided metallic cerium, containing the above mentioned rare metals, which material will constitute the contact mass preferably used in my process, but other catalysts, within the scope of the appended claims, may be used. The contact mass as above, or as otherwise prepared, is then placed in a tube and heated to a temperature of about 300 to 600° C., preferably about 350° C. to 450° C., and a mixture of hydrogen and nitrogen, preferably in the approximate proportions of 3:1 by volume, is then passed thereover, while under pressure. A pressure of 60 to 80 atmospheres (900 to 1200 pounds per square inch) gives excellent results.

The action of the catalytic is to convert a part of the nitrogen and hydrogen into ammonia, which may be removed from the gas mixture leaving the contact chamber by any suitable method, for example, by passing the gases in contact with sulfuric or other acid, to form ammonium salts, such as sulfate, or in contact with highly acid superphosphate thereby forming ammoniated superphosphate, which is a valuable fertilizer. The remaining gases, containing hydrogen and nitrogen, after drying and purifying if necessary, are then passed to gether with more of the mixture of hydrogen and nitrogen, over the contact material, to convert another fraction into ammonia, which may be removed in the same manner.

The absorption of ammonia should preferably take place while the gases are maintained under substantially the same pressure as is present in the contact apparatus, in order to avoid excessive use of power, and the expense incident thereto. Thus is established a closed circuit of gas under pressure, from the gas holder through the contact chamber, to and through the absorber, and back to the gas holder, while additional gas is constantly added in amounts substantially equal to the amounts of nitrogen and hydrogen converted into ammonia.

The gases may pass through a series of alternated contact chambers and absorption chambers, and then if any considerable amount of hydrogen and nitrogen remain uncombined, they may pass back to the gas holder.

The mixture of hydrogen and nitrogen used should be as free as possible from oxygen, water, sulfur compounds and carbon dioxid, but small amounts of carbon monoxid and certain other gases do not appear to be particularly injurious, except as diluents.

In passing the gases repeatedly over the contact mass, any excess of either gas over the ratio of 3:1 will accumulate, and periodically the gases in or entering the contact chamber should be tested to see that this ratio exists, and any material variation therefrom should be compensated for by appropriate additions of gas. Also if any considerable amount of inert diluents are present in the gases, these will progressively increase and when the amount of diluents gets high, the gas should be allowed to escape to waste, or be otherwise utilized, or the diluents removed by appropriate methods, e. g., if the diluents consist largely of CO, this may be removed by liquefaction, after which the hydrogen and nitrogen may be returned to the process.

It will be noted that the porous charcoal, treated as above described is an excellent hydrogen occluding agent, being capable of absorbing, occluding, taking up, and holding many times its volume of hydrogen. Cerium is also well known to unite with free nitrogen to form cerium nitrid. Hence the preferred catalyst employed comprises a hydrogen occluding agent (the charcoal) having maculated or coated thereupon, a nitrogen occluding agent, (cerium) and containing activating agents (yttrium, etc). Aside from this, the cerium itself acts as a catalyst, of great power, in producing the union of hydrogen and nitrogen.

While I have described my process in great detail, I do not limit myself to these exact details, but only by the scope of the following claims.

The catalyzer comprising cerium or similarly acting metal, will under some conditions be partially or entirely converted by the action of a mixture of hydrogen and nitrogen, into nitrid or other nitrogen-containing body, which body exercises substantially the same effect as metallic cerium, or in other words the catalytic activity of the cerium or similarly acting metal is not materially lowered by the conversion of all or a portion thereof into nitrid or other nitrogen-containing body. Accordingly in the appended claims, the expressions "cerium" "tetravalent metal having the property of catalytically causing the union of hydrogen and nitrogen", "catalytic metal having the property of aiding the union of hydrogen and nitrogen", "nitrogen-occluding substance" "metal in a non-oxidized condition", "metallic cerium containing activating agents", "metal of the cerium group capable of effecting the combination of hydrogen and nitrogen", "catalytic metal of the cerium group", "catalytic substance containing a metal" "substance containing a metal which in the free state is capable of combining with nitrogen" and similar expressions are intended to cover either the metal in the free or metallic state, or the metal in an active condition, as regards its possession of capability of catalytically effecting the combination of hydrogen and nitrogen, although said metal may not be in the free state, but may be in the form of a nitrogen-containing compound, or other compound of said metal. It is also possible that the catalytic substance when containing cerium and another metal may react either with the said other metal, or with nitrogen, or with hydrogen, or with ammonia, or with two or more of these substances with the production of more complex bodies than nitrids, and such complex compounds are likewise intended to be included within the scope of the appended claims.

What I claim is:—

1. A process of making ammonia which comprises passing a gas mixture containing hydrogen and nitrogen into contact with a catalyzer containing a porous base carrying cerium and another substance capable of increasing the catalytic activity thereof.

2. A process of making ammonia which comprises passing a gas mixture containing hydrogen and nitrogen into contact with a catalyzer containing a tetravalent metal having the property of catalytically causing the union of hydrogen and nitrogen, and another metal capable of increasing the catalytic activity.

3. A process of making ammonia which comprises passing a gas mixture containing hydrogen and nitrogen into contact with a catalyzer containing cerium and small amounts of lanthanum, didymium, and yttrium.

4. A process of making ammonia which comprises passing a gas mixture containing hydrogen and nitrogen into contact with a catalyzer containing granular carbon and catalytic metal having the property of aiding in the union of hydrogen and nitrogen.

5. A process of making ammonia which comprises passing a gas mixture containing hydrogen and nitrogen into contact with a catalyzer containing granular cocoanut charcoal and a catalytic metal having the property of aiding in the union of hydrogen and nitrogen.

6. A process of making ammonia which comprises passing a gas mixture containing hydrogen and nitrogen into contact with a catalyzer containing granular cocoanut charcoal from which soluble matter has been removed, and carrying a catalytic metal having the property of aiding in the union of hydrogen and nitrogen.

7. A process of making ammonia which comprises passing a gas mixture containing hydrogen and nitrogen into contact with a catalyzer containing granular charcoal extracted with acid, and cerium containing activating metals.

8. A process of making ammonia which comprises passing a gas mixture containing hydrogen and nitrogen into contact with a suitable contact mass, removing the ammonia formed, and thereafter again passing the remaining gases into contact with a suitable contact mass containing cerium.

9. A process of making ammonia which comprises passing a gas mixture containing hydrogen and nitrogen, into contact with a suitable contact mass under a pressure not materially above 80 atmospheres, removing the ammonia formed, and thereafter again passing the remaining gases into contact with a suitable contact mass containing cerium.

10. A process of making ammonia which comprises passing a gas mixture containing hydrogen and nitrogen, into contact with a suitable contact mass containing cerium, under pressure of from 60 to 80 atmospheres, removing the ammonia formed, and thereafter again passing the remaining gases into contact with a suitable contact mass containing cerium.

11. A process of making ammonia which comprises passing a gas mixture containing hydrogen and nitrogen into contact with a suitable contact mass containing cerium, at a temperature of about 350° C., to 450° C., removing the ammonia formed and thereafter again passing the remaining gases into contact with a suitable contact mass containing cerium.

12. A process of making and absorbing ammonia which comprises converting a portion of a gas mixture containing hydrogen and nitrogen into ammonia, absorbing the ammonia in an acid superphosphate, and thereafter converting a portion of the remaining gases into ammonia.

13. A process of making ammonia which comprises passing a gas mixture containing hydrogen and nitrogen, into contact with a suitable calalytic mass, absorbing the ammonia in a material containing an acid, drying the gases, and thereafter again passing the remaining gases into contact with a suitable catalytic mass.

14. A process of making ammonia which comprises passing a gas mixture containing hydrogen and nitrogen, but substantially free from oxygen and sulfur into contact with a suitable contact mass containing cerium, removing the ammonia formed, and thereafter again passing the remaining gases into contact with a suitable contact mass containing cerium.

15. A process of making ammonia which comprises passing a gas mixture containing hydrogen and nitrogen, but substantially free from sulfur compounds, into contact with a suitable contact mass, containing a nitrogen-occluding substance, removing the ammonia formed, and thereafter again passing the remaining gases into contact with a suitable contact mass containing a nitrogen-occluding substance.

16. A process of making ammonia which comprises passing a gas mixture containing hydrogen and nitrogen, into contact with a suitable contact mass containing a nitrogen-occluding agent removing the ammonia formed, and thereafter again passing the remaining gases into contact with the same contact mass.

17. In the catalytic treatment of gases the step which comprises passing the gases repeatedly into contact with a catalytic comprising granular carbonaceous material and cerium.

18. In the catalytic treatment of gases, the step which comprises passing the gases repeatedly into contact with a catalytic comprising granular carbonaceous material and cerium, and removing the product from the gases after each passage into contact with the catalytic.

19. A process of making ammonia which comprises bringing a mixture of gases containing hydrogen and nitrogen into contact with a catalyst comprising a hydrogen-occluding agent having a nitrogen-occluding agent coated thereupon.

20. A process of making ammonia which comprises bringing a mixture of gases containing hydrogen and nitrogen into contact with a catalyst comprising a granular, porous carrier having a nitrogen-occluding agent coated thereupon.

21. A process of making ammonia which comprises bringing a mixture of gases containing hydrogen and nitrogen into contact with a catalyst comprising a carbonaceous base associated with a nitrogen-occluding agent.

22. A process of synthetically producing ammonia which comprises bringing a gas mixture comprising hydrogen and nitrogen into contact with a catalyzer comprising a base or carrier permeable to gases said carrier being coated, over at least a portion of its surface with a nitrogen-occluding agent comprising a plurality of metals in a non-oxidized condition, while maintaining said gas mixture under a pressure between about 60 and about 100 atmospheres.

23. A process of making ammonia which comprises passing a gas mixture comprising hydrogen and nitrogen in the proportions of about 3:1 by volume, in contact with a catalyst comprising metallic cerium containing activating agents, maculated upon porous, granular, absorptive charcoal free from soluble materials.

24. The process of making ammonia which comprises bringing a mixture of gases containing hydrogen and nitrogen and essentially and substantially free from moisture and oxygen under a pressure of 60 to 80 atmospheres into contact with a catalyst comprising a granular porous carrier having a nitrogen occluding agent supported thereon.

25. The process of making ammonia which comprises bringing a mixture of gases containing hydrogen and nitrogen under a pressure of about 60 to 80 atmospheres into contact with a catalyst comprising a carrier having a nitrogen occluding agent supported thereon.

26. A process of making ammonia, which comprises passing a gas mixture containing hydrogen and nitrogen, but substantially free from both moisture and oxygen, into contact with a catalyst comprising a metal of the cerium group which has the property of effecting the combination of hydrogen and nitrogen.

27. A process of making ammonia which comprises passing a gas containing hydrogen and nitrogen, at a pressure of about 60 to 80 atmospheres, into contact with a catalyst comprising a metal of the cerium group which has the property of effecting the combination of hydrogen and nitrogen.

28. A process of making ammonia which comprises passing a gas mixture comprising hydrogen and nitrogen while maintaining said gas mixture under a pressure of between about 60 and about 90 atmospheres, into contact with a catalytic body comprising a catalytic substance capable of causing the combination of hydrogen and nitrogen.

29. A process of making ammonia which comprises passing a gas mixture comprising hydrogen and nitrogen while at a pressure not materially below 60 atmospheres and not materially above 90 atmospheres, into contact with a catalytic body comprising a catalytic substance containing a metal capable of combining with nitrogen and adapted to catalytically effect the combination of hydrogen and nitrogen, said substance being deposited upon a suitable porous carrier.

30. A process of making ammonia which comprises passing a gas mixture which contains hydrogen and nitrogen while at a pressure materially less than 100 atmospheres, into contact with a catalytic body comprising a catalytic substance adapted to cause the combination of hydrogen and nitrogen, deposited upon a suitable carrier.

31. A process of making ammonia by synthesis which comprises subjecting a mixture comprising hydrogen and nitrogen in the substantial absence of catalyzer poisons at a pressure between about 60 atmospheres and about 90 atmospheres to the action of a catalytic body, at a temperature of between about 350° C., and about 600° C., said catalytic body comprising a base which is porous to gases, carrying a substance having the property of catalytically effecting the combination of hydrogen and nitrogen, said substance containing a metal which in the free state is capable of combining with nitrogen.

32. A process of making ammonia by synthesis which comprises subjecting a mixture comprising hydrogen and nitrogen in the substantial absence of catalyzer poisons at a pressure between about 60 atmospheres and about 90 atmospheres to the action of a catalytic body, at a temperature of between about 350° C. and about 600° C., said catalytic body comprising a base which is porous to gases, carrying a substance having the property of catalytically effecting the combination of hydrogen and nitrogen, said substance containing a metal which in the free state is capable of combining with nitrogen, removing the formed ammonia from the gas mixture, and again bringing the resulting gas mixture into contact with a catalytic body of the nature stated.

33. A process of making ammonia which comprises passing a gas mixture comprising hydrogen and nitrogen into a contact chamber containing a catalytic body comprising a porous base having gas-absorptive properties and having deposited thereupon a material capable of catalytically effecting the combination of hydrogen and nitrogen, said material including a metal in a non-oxidized condition, which metal is capable of combining with free nitrogen, and maintaining a pressure in the contact chamber between about 60 atmospheres and about 80 atmospheres, and maintaining said catalytic body at a temperature at which it will effect the combination of nitrogen and hydrogen to produce ammonia.

34. A process of making ammonia which comprises passing a mixture of gases containing hydrogen and nitrogen, in contact with a catalyst comprising a base which is permeable to gases having coated thereupon a non-oxidized serium-containing material capable of catalytically effecting the union of hydrogen and nitrogen coated, while said gas mixture is maintained at a pressure between about 60 and 90 atmospheres.

35. A process of producing ammonia from its elements which comprises subjecting a nitrogen-occluding agent, in the non-oxidized condition, to the action of hydrogen and nitrogen at a pressure of about 60 to 90 atmospheres, while carried by and supported upon a non-pulverulent base or carrier which is permeable to said gas mixture, and while said agent is maintained at a temperature favoring its property of effecting the catalysis of ammonia from its elements, and while in the absence of catalyzer poisons capable of deleteriously affecting said agent.

In testimony whereof I have affixed my signature hereto.

CARLETON ELLIS.